(12) United States Patent
Streater

(10) Patent No.: US 8,660,181 B2
(45) Date of Patent: Feb. 25, 2014

(54) METHOD OF COMPRESSING VIDEO DATA AND A MEDIA PLAYER FOR IMPLEMENTING THE METHOD

(75) Inventor: Stephen Bernard Streater, London (GB)

(73) Assignee: Forbidden Technologies PLC, London (GB)

( * ) Notice: Subject to any disclaimer, the term of this patent is extended or adjusted under 35 U.S.C. 154(b) by 894 days.

(21) Appl. No.: 12/160,070

(22) PCT Filed: Jan. 4, 2007

(86) PCT No.: PCT/GB2007/000016
§ 371 (c)(1),
(2), (4) Date: Oct. 7, 2008

(87) PCT Pub. No.: WO2007/077447
PCT Pub. Date: Jul. 12, 2007

(65) Prior Publication Data
US 2009/0220003 A1 Sep. 3, 2009

(30) Foreign Application Priority Data
Jan. 6, 2006 (GB) .................................. 0600217.4

(51) Int. Cl.
*H04N 7/12* (2006.01)
(52) U.S. Cl.
USPC ................. 375/240.15; 375/240; 375/240.01; 375/240.12; 375/240.13; 375/240.14; 382/232; 382/236

(58) Field of Classification Search
USPC ...................... 375/240–240.25; 382/232–253
See application file for complete search history.

(56) References Cited

U.S. PATENT DOCUMENTS

| | | | | |
|---|---|---|---|---|
| 5,057,932 A * | 10/1991 | Lang | ............................. | 386/314 |
| 5,754,239 A * | 5/1998 | Wilkinson | ................ | 375/240.15 |
| 6,020,924 A * | 2/2000 | Jahanghir | ................ | 375/240.16 |
| 7,197,070 B1 * | 3/2007 | Zhang et al. | ............. | 375/240.01 |
| 2003/0091000 A1 * | 5/2003 | Chu et al. | ...................... | 370/230 |
| 2003/0167472 A1 * | 9/2003 | Barbanson et al. | ........... | 725/131 |
| 2005/0180646 A1 * | 8/2005 | Denoual et al. | ............... | 382/239 |
| 2006/0088094 A1 * | 4/2006 | Cieplinski et al. | ....... | 375/240.01 |

FOREIGN PATENT DOCUMENTS

| | | |
|---|---|---|
| DE | 10358846 A1 | 7/2005 |
| JP | 11-341498 | 12/1999 |

OTHER PUBLICATIONS

Multithreaded Distributed MPEG1-Video Delivery in the Internet Environment by Jung et al; Date: Mar. 2000; Publisher: ACM.*
Heterogeneous Video Transcoding to Lower Spatio-Temporal Resolutions and Different Encoding Formats by Shanableh et al; Publisher: IEEE; Year: 2000.*

(Continued)

*Primary Examiner* — Madhuri Herzog
(74) *Attorney, Agent, or Firm* — Fay Sharpe LLP

(57) ABSTRACT

A method of receiving video data comprising the steps of: receiving at least one chunk of video data comprising a number of sequential key video frames where the number is at least two and, constructing at least one delta frame between a nearest preceding key frame and a nearest subsequent key frame from data contained in the either or each of the nearest preceding and subsequent frames.

13 Claims, 2 Drawing Sheets

(56) References Cited

OTHER PUBLICATIONS

Jung et al., "Multithreaded Distributed MPEG1-Video Delivery in the Internet Environment", Proceedings of the 2000 ACM Symposium on Applied Computing (SAC '00), Mar. 19-21, 2000, pp. 592-597.

International Search Report of International Application No. PCT/GB2007/000016, dated Nov. 30, 2007.
Written Opinion of International Application No. PCT/GB2007/000016, dated Nov. 30, 2007.

* cited by examiner

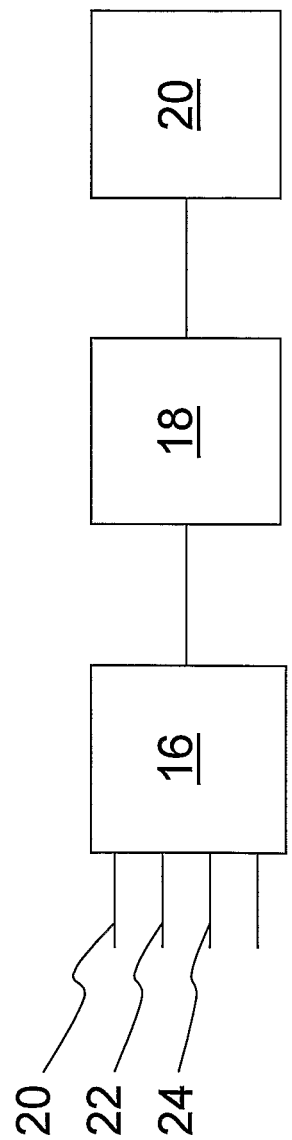

METHOD OF COMPRESSING VIDEO DATA AND A MEDIA PLAYER FOR IMPLEMENTING THE METHOD

TECHNICAL FIELD AND BACKGROUND ART

Visual recordings of moving things are generally made up of sequences of successive images. Each such image represents a scene at a different time or range of times. This invention relates to such sequences of images such as are found, for example, in video, film and animation.

Video takes a large amount of memory, even when compressed. The result is that video is generally stored remotely from the main memory of the computer. In traditional video editing systems, this would be on hard discs or removable disc storage, which are generally fast enough to access the video at full quality and frame rate. It is foreseen that people will wish to access and edit video file content remotely, over the internet, in real time.

This invention relates to the applications of video editing (important as much video content on the web will have been edited to some extent), video streaming, and video on demand.

At present any media player editor implementing a method of transferring video data across the internet in real time suffers the technical problems that:

(1) the internet connection speed available to internet users is, from moment to moment, variable and unpredictable; and (2) that the CPU speed available to internet users is from moment to moment variable and unpredictable.

For the application of video editing consistent image quality is very preferable, because many editing decisions are based on aspects of the image, for example, whether the image was taken in focus or out.

STATEMENT OF INVENTION

It is an object of the present invention to alleviate at least some of the aforementioned technical problems. Accordingly the present invention provides a method of receiving video data comprising the steps of: receiving at least one chunk of video data comprising a number (n) of sequential key video frames where the number (n) is at least two and, constructing at least one delta frame between a nearest preceding key frame and a nearest subsequent key frame from data contained in either, or each, of the nearest preceding and subsequent frames.

Preferably the delta frame is composed of a plurality of component blocks or pixels and each component of the delta frame is constructed according to data indicating it is one of: the same as the corresponding component in the nearest preceding key frame, or the same as the corresponding component in the nearest subsequent key frame, or a new value compressed using some or all of the spatial compression of the delta frame and information from the nearest preceding and subsequent frames. After the step of construction the delta frame may be treated as a key frame for the construction of one or more further delta frames. Delta frames may continue to be constructed in a chunk until either: a sufficiently good predetermined image playback quality criterion is met or the time constraints of playing the video in real time require the frames to be displayed.

The number of key frames in a chunk is in the range from n=3 to n=10.

Although the method may have other applications it is particularly advantageous when the video data is downloaded across the internet. In such a case it is convenient to download each key frame in a separate download slot, the number of said download slots equating to the maximum number of download slots supportable by the internet connection at any moment in time. Preferably each slot is implemented in a separate thread.

Where it is desired to subsequently edit the video it is preferable that each frame, particularly the key frames are cached upon first viewing to enable subsequent video editing.

According to another aspect of the present invention there is provided a media player having means to implement the method which preferably comprises a receiver to receive chunks of video data consisting of at least two key frames, and a processor adapted to construct a delta frame sequentially between a nearest preceding key frame and a nearest subsequent key frame. Preferably, a memory is also provided for caching frames as they are first viewed to reduce the subsequent requirements for downloading.

According to a third aspect of the present invention there is provided a method of compressing video data so that the video can be streamed across a limited bandwidth connection with no loss of quality on displayed frames which entails storing video frames at various temporal resolutions which can be accessed in a pre-defined order, stopping at any point. Thus multiple simultaneous internet accesses can ensure a fairly stable frame rate over a connection by (within the resolution of the multitasking nature of the machine) simultaneously loading the first or subsequent temporal resolution groups of frames from each of a number of non-intersecting subsets of consecutive video frames until either all the frames in the group or downloaded, or there would probably not be time to download the group, in which case a new group is started.

The invention described herein is a method for enabling accurate editing decisions to be made over a wide range of internet connection speeds, as well as video playback which uses available bandwidth efficiently to give a better experience to users with higher bandwidth. Traditional systems have a constant frame rate, but the present invention improves quality by adding extra delta frame data, where bandwidth allows.

DESCRIPTION

A method of compressing video data and a media player for implementing the method will now be described, by way of example only, with reference to the accompanying drawings in which:

FIG. 3 is a schematic diagram of a media player.

A source which contains images making up a video, film, animation or other moving picture is available for the delivery of video over the internet. Images (2, 4, 6 . . . ) in the source are digitised and labelled with frame numbers (starting from zero) where later times correspond to bigger frame numbers and consecutive frames have consecutive frame numbers. The video also has audio content, which is split into sections.

The video frames are split into chunks as follows:

A value of n is chosen to be a small integer 0<=n. In one implementation, n is chosen to be 5. A chunk is a set of consecutive frames of length $2^n$. All frames appear in at least one chunk, and the end of each chunk is always followed immediately by the beginning of another chunk.

"f" represents the frame number in the chunk, where the earliest frame (2) in each chunk has f=0, and the last (8) has f=$2^n$−1.

Figure 1:
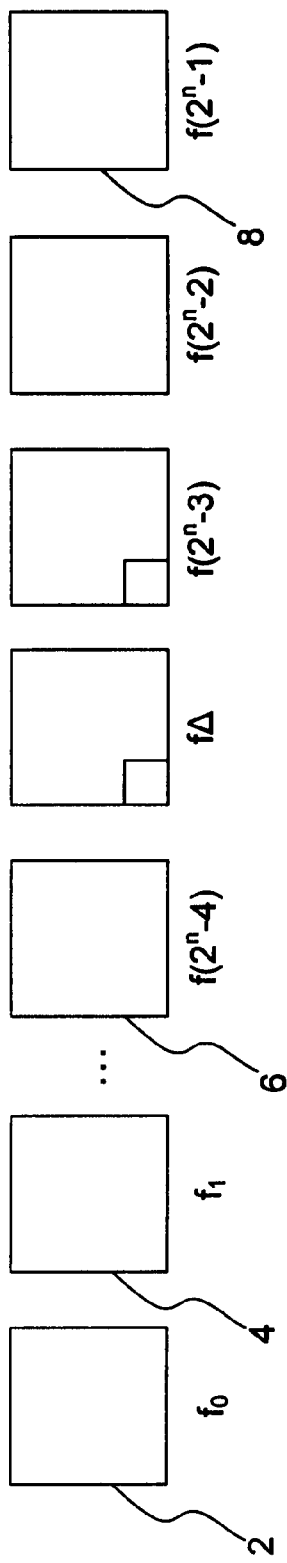
FIG. 1 is a schematic diagram of a sequence of video frames.
Figure 2:
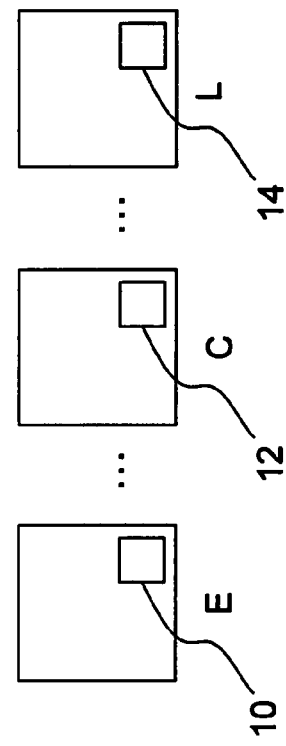
FIG. 2 is a schematic diagram illustrating construction of a delta frame.

All f=0 frames in a chunk are compressed as key frames—that is they can be recreated without using data from any other frames. All frames equidistant in time between previously compressed frames are compressed as delta frames recursively as follows:

Let frame C (FIG. 2) be the delta frame being compressed. Then there is a nearest key frame earlier than this frame, and a nearest key frame later than this frame, which have already been compressed. Let us call them E and L respectively. Each frame is converted into a spatially compressed representation, in one implementation consisting of rectangular blocks of various sizes with four Y or UV values representing the four corner values of each block in the luminance and chrominance respectively.

Frame C is compressed as a delta frame using information from frames E and L (which are known to the decompressor), as well as information as it becomes available about frame C.

In one implementation, the delta frame is reconstructed as follows:

Each component (12) of the image (pixel or block) is represented as either:

the same as the corresponding component (10) in frame E; or the same as the corresponding component (14) in frame L; or a new value compressed using some or all of spatial compression of frame C, and information from frames E and L.

Compressing the video data in this way allows the second part of the invention to function. This is described next.

When transferring data across the internet, using the HTTP protocol used by web browsers the described compression has advantages, for example enabling access through many firewalls. The two significant factors relevant to this invention are latency and bandwidth. The latency is the time taken between asking for the data and it starting to arrive. The bandwidth is the speed at which data arrives once it has started arriving.

For a typical domestic broadband connection, the latency can be expected to be between 20 ms and 1 s, and the bandwidth can be expected to be between 256 kb/s and 8 Mb/s.

The invention involves one compression step for all supported bandwidths of connection, so the player (16, FIG. 3) has to determine the data to request which gives the best playback experience. This is done as follows:

The player has a number of download slots (20, 22, 24 . . . ) for performing overlapping downloads, each running effectively simultaneously with the others. At any time, any of these may be blocked by waiting for the latency or by lost packets. Each download slot is used to download a key frame, and then subsequent files (if there is time) at each successive granularity. When all files pertaining to a particular section are downloaded, or when there would not be time to download a section before it is needed for decompression by the processor (18), the download slot is applied to the next unaccounted for key frame.

In one implementation of the invention, each slot is implemented in a separate thread.

A fast link means that all frames are downloaded, but slower links download variable frame rate at 1, ½, ¼ etc of the frame rate of the original source video for each chunk. This way the video can play back with in real time at full quality, possibly with some sections of the video at lower frame rate.

In a further implementation of the invention, as used for video editing, frames downloaded in this way are cached in a memory (20) when they are first seen, so that on subsequent accesses, only the finer granularity videos need be downloaded.

The number of slots depends on the latency and the bandwidth and the size of each file, but is chosen to be the smallest number which ensures the internet connection is fully busy substantially all of the time.

In one implementation, when choosing what order to download or access the data in, the audio is given highest priority (with earlier audio having priority over later audio), then the key frames, and then the delta frames (within each chunk) in the order required for decompression with the earliest first.

The invention claimed is:

1. A method of compressing video data with no loss of frame image quality on the displayed frames, by varying the frame rate relative to the original source video, the method comprising the steps of:

receiving at least two chunks of uncompressed video data, each chunk comprising at least two sequential video frames and, compressing at least one frame in each chunk as a key frame, for reconstruction without the need for data from any other frames, compressing at least one intermediate frame as a delta frame between a nearest preceding key frame and a nearest subsequent key frame from data contained in either or each of the nearest preceding and subsequent frames, wherein further intermediate frames are compressed as further delta frames within the same chunk, by treating any previously compressed delta frame as a key frame for constructing said further delta frames, and storing the compressed video frames at various mutually exclusive temporal resolutions, which are accessed in a pre-defined order, in use, starting with key frames, and followed by each successive granularity of delta frames, stopping at any point; and whereby the frame rate is progressively increased as more intermediate data is accessed.

2. A method according to claim 1 wherein the delta frame is composed of a plurality of component blocks or pixels and each component of the delta frame is constructed according to data indicating it is one of:

(1) the same as the corresponding component in the nearest preceding key frame, or (2) the same as the corresponding component in the nearest subsequent key frame, or (3) a new value compressed using some or all of the spatial compression of frame, and information from the nearest preceding and subsequent frames.

3. A method according to claim 1 wherein after the step of construction the delta frame is treated as a key frame for the construction of one or more delta frames.

4. A method according to claim 1 wherein delta frames continue to be constructed in a chunk until either:

a predetermined image playback quality criterion, including a frame rate required by an end-user, is met or the time constraints of playing the video in real time require the frame to be displayed.

5. A method according to claim 1 wherein the number of frames in a chunk is $2^n$, and n is in the range from n=3 to n=10.

6. A method according to claim 1 comprising downloading the video data across the internet.

7. A method according to claim 6 comprising downloading each key frame in a separate download slot, the number of said download slots equating to the minimum number to fully utilize the internet connection.

8. A method according to claim 7 wherein each slot is implemented in a separate thread.

9. A method according to claim 1 wherein each frame is cached upon first viewing to enable subsequent video editing.

10. A method according to claim 9 wherein the key frames are cached.

11. A method of processing video data comprising the steps of:
   receiving at least one chunk of video data comprising $2^n$ frames and one key video frame, and the next key video frame;
   constructing a delta frame (C) equidistant between a nearest preceding key frame (E) and a nearest subsequent key frame (L) from data that includes data contained in either or each of the nearest preceding and subsequent key frames;
   constructing additional delta frames equidistant between a nearest preceding key frame and a nearest subsequent key frame from data that includes data contained in either or each of the nearest preceding and subsequent key frames, wherein at least one of the nearest preceding key frame or the nearest subsequent key frame is any previously constructed delta frame;
   storing the additional delta frames at various mutually exclusive temporal resolutions, which are accessible in a pre-defined order, in use, starting with the key frames, and followed by each successive granularity of delta frames, stopping at any point; and
   continuing to construct the additional delta frames in a chunk until either a predetermined image playback quality criterion, including a user selected frame rate, is achieved, or a time constraint associated with playing of the chunk of video data in real time requires the frames to be displayed.

12. The method according to claim 11, further comprising downloading the at least one chunk of video data at a frame rate that is less than an original frame rate associated with the received video data.

13. The method of claim 11, further comprising determining a speed associated with the receipt of the at least one image chunk, and only displaying a plurality of constructed frames in accordance with the time constraint and the determined speed.

* * * * *

UNITED STATES PATENT AND TRADEMARK OFFICE
CERTIFICATE OF CORRECTION

PATENT NO.       : 8,660,181 B2
APPLICATION NO. : 12/160070
DATED            : February 25, 2014
INVENTOR(S)      : Stephen Bernard Streater It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this
Twenty-ninth Day of September, 2015

Michelle K. Lee
*Director of the United States Patent and Trademark Office*